US007580349B1

(12) United States Patent
Wang et al.

(10) Patent No.: US 7,580,349 B1
(45) Date of Patent: Aug. 25, 2009

(54) CONTENT-AWARE DYNAMIC NETWORK RESOURCE ALLOCATION

(75) Inventors: Phil Y. Wang, Nepean (CA); Tal Lavian, Sunnyvale, CA (US); Ramesh Durairaj, Santa Clara, CA (US); Richard Brand, Palo Alto, CA (US); Franco Travostino, Arlington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 922 days.

(21) Appl. No.: 10/286,591

(22) Filed: Nov. 1, 2002

Related U.S. Application Data

(60) Provisional application No. 60/336,469, filed on Nov. 2, 2001.

(51) Int. Cl.
*H04L 12/26* (2006.01)
*H04L 12/28* (2006.01)

(52) U.S. Cl. .................. 370/230; 370/392; 370/401

(58) Field of Classification Search ............... 370/216, 370/218, 230, 389, 392, 401, 228, 395.2, 370/395.21, 395.41, 395.43
See application file for complete search history.

(56) References Cited

U.S. PATENT DOCUMENTS

| | | | | |
|---|---|---|---|---|
| 5,893,911 | A * | 4/1999 | Piskiel et al. ................. 707/10 |
| 5,995,503 | A * | 11/1999 | Crawley et al. ............. 370/351 |
| 6,594,260 | B1 | 7/2003 | Aviani et al. ................ 370/389 |
| 6,631,134 | B1 * | 10/2003 | Zadikian et al. ........ 370/395.21 |
| 6,850,980 | B1 * | 2/2005 | Gourlay ...................... 709/226 |
| 6,856,627 | B2 * | 2/2005 | Saleh et al. .................. 370/397 |
| 6,876,668 | B1 * | 4/2005 | Chawla et al. .............. 370/468 |
| 6,950,391 | B1 * | 9/2005 | Zadikian et al. ............. 370/219 |
| 2002/0067726 | A1 * | 6/2002 | Ganesh et al. ............... 370/392 |
| 2002/0087699 | A1 * | 7/2002 | Karagiannis et al. ........ 709/227 |
| 2002/0136204 | A1 * | 9/2002 | Chen et al. ................... 370/352 |
| 2002/0150093 | A1 * | 10/2002 | Ott et al. ...................... 370/389 |
| 2003/0165139 | A1 * | 9/2003 | Chen et al. ................... 370/392 |
| 2003/0169749 | A1 * | 9/2003 | Huang et al. ................. 370/401 |
| 2003/0210694 | A1 * | 11/2003 | Jayaraman et al. .......... 370/392 |
| 2005/0185654 | A1 * | 8/2005 | Zadikian et al. ........ 370/395.21 |

OTHER PUBLICATIONS

Kumar, V.P., Lakshman, T.V., Stiliadis, D., "Beyond Best Effort: Router Architectures for the Differentiated Services of Tomorrow's Internet", IEEE Communications Magazine, May 1998, pp. 152-164.

* cited by examiner

*Primary Examiner*—Wing F. Chan
*Assistant Examiner*—Hong Sol Cho
(74) *Attorney, Agent, or Firm*—Mintz, Levin, Cohn, Ferris, Glovsky and Popeo PC

(57) ABSTRACT

Network resources allocated for particular application traffic are aware of the characteristics of L4+ content to be transmitted. One embodiment of the invention realizes network resource allocation in terms of three intelligent modules, gateway, provisioning and classification. A gateway module exerts network control functions in response to application requests for network resources. The network control functions include traffic path setup, bandwidth allocation and so on. Characteristics of the content are also specified in the received application network resource requests. Under request of the gateway module, a provisioning module allocates network resources such as bandwidth in optical networks and edge devices as well. An optical network resource allocation leads to a provisioning optical route. Under request of the gateway module, a classification module differentiates applications traffic according to content specifications, and thus creates and applies content-aware rule data for edge devices to forward content-specified traffic towards respective provisioning optical routes.

20 Claims, 4 Drawing Sheets

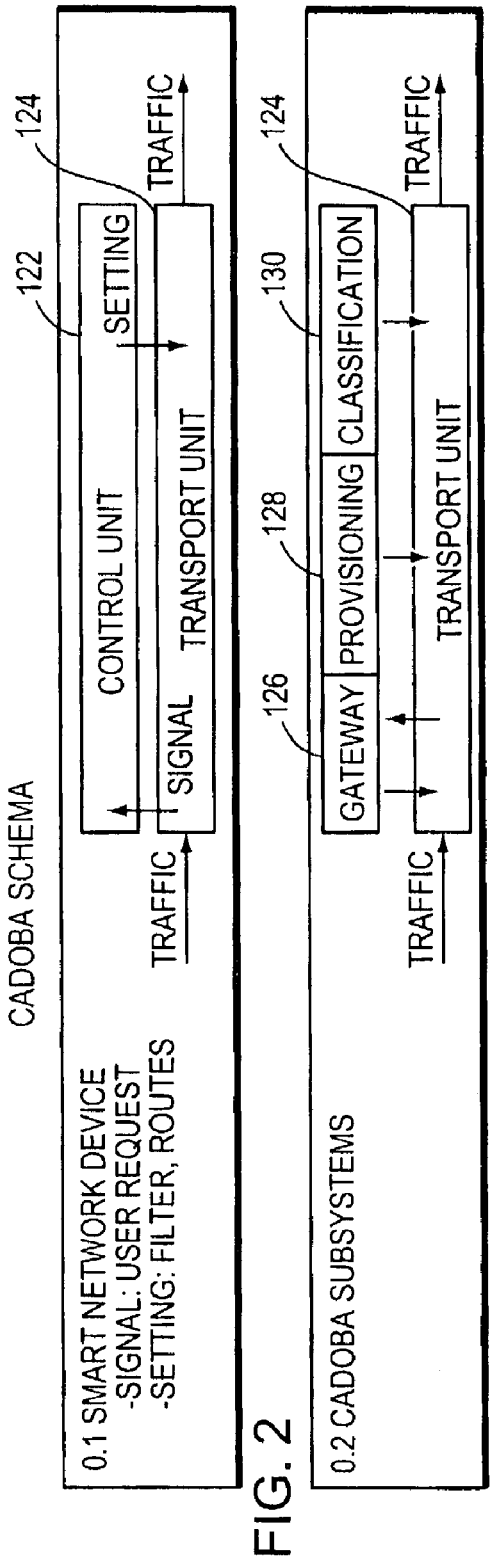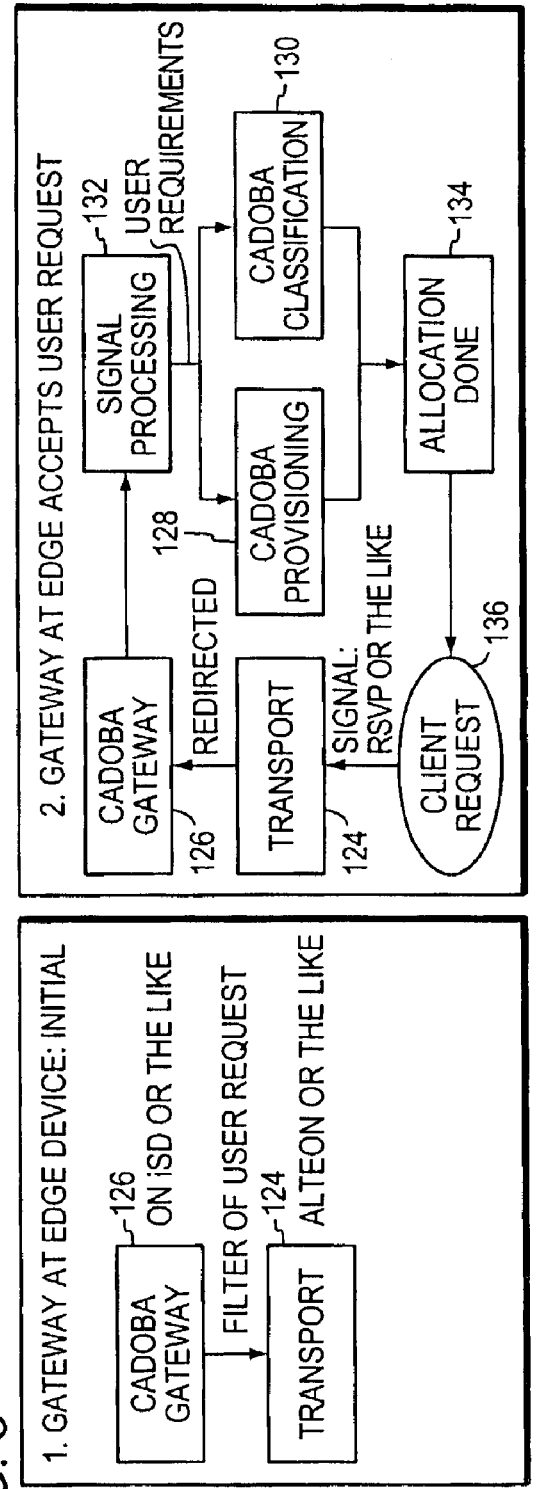

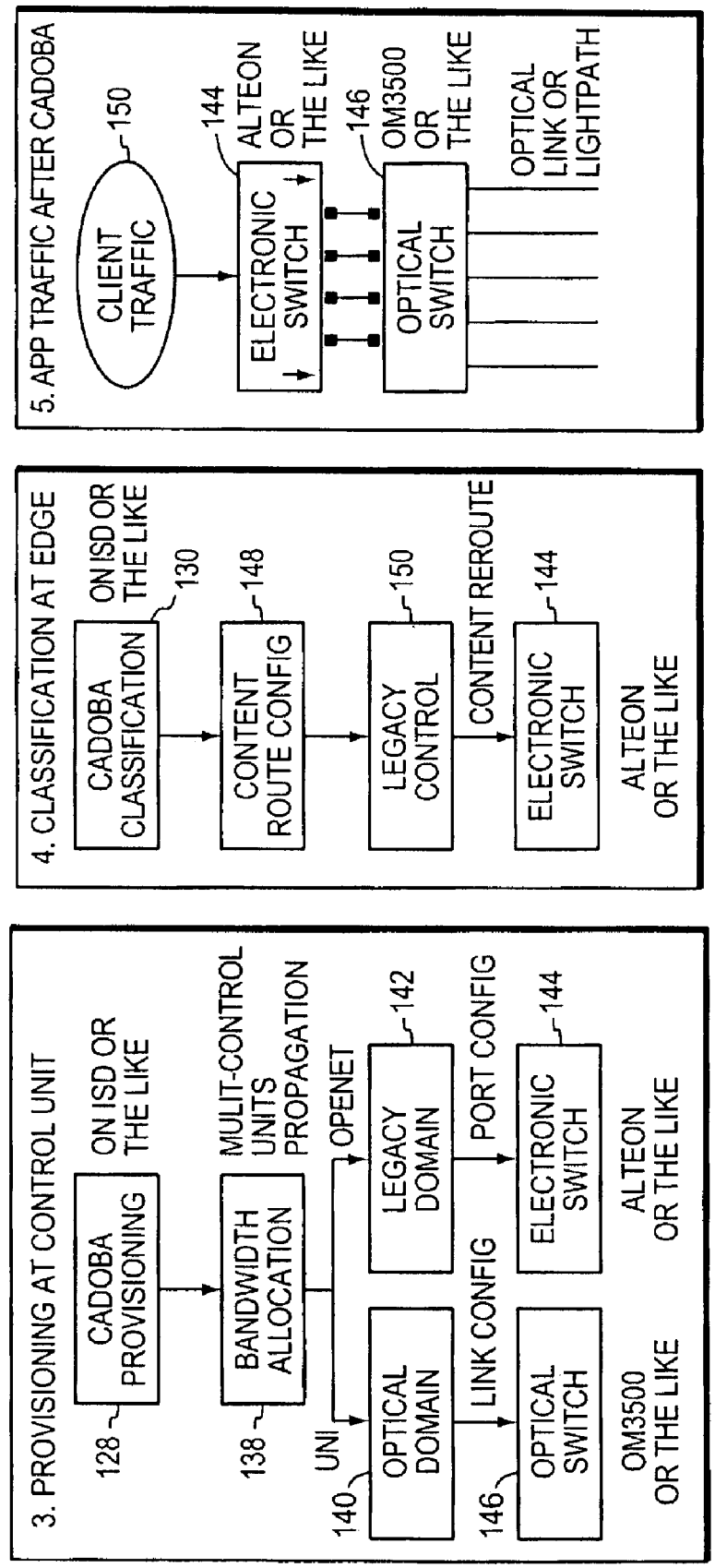

CONTENT-AWARE DYNAMIC NETWORK RESOURCE ALLOCATION

CROSS REFERENCE TO RELATED APPLICATIONS

This application claims priority to U.S. provisional application Ser. No. 60/336,469 filed Nov. 2, 2001 and entitled "Content-Aware Dynamic Bandwidth Allocation.

BACKGROUND OF THE INVENTION

The present invention relates to content-aware dynamic network resource allocation in a network such as the Internet and in one embodiment to content-aware dynamic optical bandwidth allocation.

The Internet is a data transport network including legacy networks and optical networks. The legacy networks exist at the outer edge of the Internet and use copper wires to connect client systems and electronic routers/switches. The optical networks form the backbone of the Internet and use fibers to connect optical cross connects or switches. Between the legacy networks and optical networks are edge devices, which are electro-optic.

Well-developed optical transport technology brings an ever-increasing amount of bandwidth to the Internet. However, with conventional network technology, end clients have little ability to exploit optical network resources for their own purposes. As a result, there is abundant bandwidth available in the backbone of the Internet. In fact, a number of emerging Internet applications such as storage area network and streaming media intend to take greater advantage of the abundant bandwidth. These applications are dynamically initiated and provide a variety of content data over the IP protocol.

More specifically, conventional network technology has the following drawbacks.

1. Static Provisioning of Optical Links

Conventional network resource provisioning establishes fixed links to connect customer networks. For example, the optical provisioning is static, fixed bandwidth, and usually takes a long time, e.g., on the order of a month, because it involves inter-network-provider service negotiations and is accomplished manually.

2. Cost of the Optical Link Bandwidth is not Divided Among Many Users and Provisioning Bandwidth is not Flexible Conventionally, provisioning an optical link (e.g., OC-48) means that a customer owns the full link bandwidth (i.e., 2.5 Gbps). This customer is fully responsible for the cost of the optical link. The cost is significant and the optical link bandwidth use is often inefficient. On the other hand, a number of users can share an optical link but they are not guaranteed a specified portion of the bandwidth.

3. Existing Signaling Protocols not Supported by Optical Gear

Applications can send their bandwidth requirements to the network using existing Internet signaling protocols such as Resource Reservation Protocol (RSVP). These protocols are at the Internet protocol (IP) layer, i.e., the layer 3 (L3), of the ISO Open System Interconnection reference model and require hardware support at network devices. However, optical devices perform data transport at the physical (L1) or the link (L2) layer and thus application signals are not processed in optical networks.

4. Optical Bandwidth Provisioning is not Aware of the Content of Application Traffic Conventional bandwidth provisioning is based on the TCP/IP characteristics of traffic flow, which include IP protocol types, source and destination IP addresses, and TCP/UDP source and destination port numbers of traffic packets. Such provisioning is limited for L4 or higher-layer content differentiation because a client may use applications that deal with multiple content traffic streams at the same time. For example, audio and video applications employ different types of content and have different bandwidth requirements. On the other hand, optical networks do not support content differentiation because optical devices do not process IP packets.

Prior attempts to solve the problems described above include the following.

1. Intserv/RSVP

RSVP is the Intserv ReSerVation Protocol under the Internet Engineering Task Force (IETF) and is used by applications to signal the network for bandwidth reservations for IP traffic. However, RSVP is thought to be not scalable because backbone routers cannot maintain the flow status for all reserved traffic passing by. In addition, optical gear does not accept RSVP signals from end applications because RSVP is an L3 IP protocol.

2. ATM

Within an asynchronous transfer mode (ATM) network, applications can invoke the ATM user-network interface (UNI) to establish virtual circuits with particular bandwidth assignments. However, the ATM UNI is not applicable for non-ATM applications.

3. GMPLS

GMPLS (Generalized MultiProtocol Label Switching) is a known protocol of traffic path establishment for next-generation optical network. GMPLS is applied with the emerging ASTN (Automatic Switch Transport Network) technology. However, GMPLS does not support granular bandwidth requests from individual clients nor does it allocate bandwidth based on the content of application traffic.

Thus, there remains a need to more fully and effectively exploit the abundant bandwidth existing at optical networks.

SUMMARY OF THE INVENTION

The present invention relates to content-aware dynamic network resource allocation. In one embodiment the network resource of interest is optical bandwidth and this embodiment is termed content-aware dynamic optical bandwidth allocation (CADOBA). Although the following often refers to the CADOBA embodiment, those of skill in the art will appreciate that one can use the present invention to allocate other network resources in addition to bandwidth. CADOBA enables clients at end legacy networks to manipulate the network resources of backbone optical networks for their own purposes. One embodiment of the invention provides three intelligent mechanisms: 1) a gateway mechanism operative to transform application requests in an application transparent way to intelligent network control; 2) a provisioning mechanism operative to perform optical link or lightpath setup and bandwidth allocation; and 3) a classification mechanism operative to differentiate application traffic based on L4+ content characteristics and to forward content streams to the provisioned routes (optical links or lightpaths).

Another embodiment of the invention provides a method for performing content-aware optical bandwidth allocation over a network including an edge device and an optical control unit. Typically networks include client systems, legacy networks, optical networks and edge devices connecting the legacy networks with the optical networks. Both legacy and optical networks have network control units. A control unit can be a part of a network device, or it can be an associated device. Both legacy and optical networks have network domains. An ISP network is an example of a network domain. All network devices in a network domain are managed in a similar way.

The method includes: receiving signal traffic of applications from the edge device; determining a network resource request for a particular application data traffic with content specification from a received signal; communicating with an optical control unit to allocate a network resource to provide a network resource provisioned route, and creating rule data for the edge device to forward content-specific application traffic onto the network resource provisioned route.

Still another embodiment of the invention provides a system for performing content aware optical bandwidth allocation over a network including an edge device and an optical control unit. The system includes a gateway module, a provisioning module in communication with the gateway module and a classification module in communication with the gateway module.

The gateway module, in communication with the edge device, receives signal traffic of applications from the edge device and determines, from the signal traffic, a bandwidth request associated with a content-specified traffic.

The provisioning module receives a provisioning request from the gateway module regarding the bandwidth request for specified content traffic, and communicates with an optical control unit to allocate optical bandwidth to provide a provisioned optical route. The provisioning module also communicates with the edge device to allocate the appropriate bandwidth for the content-specified traffic forwarding towards a provisioned optical route;

The classification module receives a content classification request from the gateway module, and, based on the classification request, creates a content-aware traffic routing rule for the edge device to forward specified content traffic to the provisioned bandwidth route.

These and other features of the invention are more fully set forth with reference to the following detailed description and the accompanying drawings.

BRIEF DESCRIPTION OF THE DRAWINGS

The foregoing and other objects, features, and advantages of the invention will be apparent from the following description and apparent from the accompanying drawings, in which like reference characters refer to the same parts.

FIG. 2 shows a breakdown of a network device, such as the content switch shown in FIG. 1, into a transport unit and a control unit;

FIG. 3 shows CADOBA subsystems that make up one embodiment of the CADOBA system, the CADOBA system residing on a control unit of FIG. 1;

FIG. 4 shows an interaction between the gateway subsystem of FIG. 3 and a transport unit of an edge device;

FIG. 5 shows an interaction from a client application, a transport unit of an edge device to the CADOBA subsystems of FIG. 3;

FIG. 6 shows an interaction between the provisioning subsystem of FIG. 3 and elements of legacy and optical networks of FIG. 1;

FIG. 7 shows an interaction between the classification subsystem of FIG. 3 and an edge device such as the electronic content switch of FIG. 1;

FIG. 8 shows the flow of application traffic through a portion of a network after operation of one embodiment of a CADOBA system according to the invention.

DETAILED DESCRIPTION OF THE ILLUSTRATED EMBODIMENTS

Figure 1:
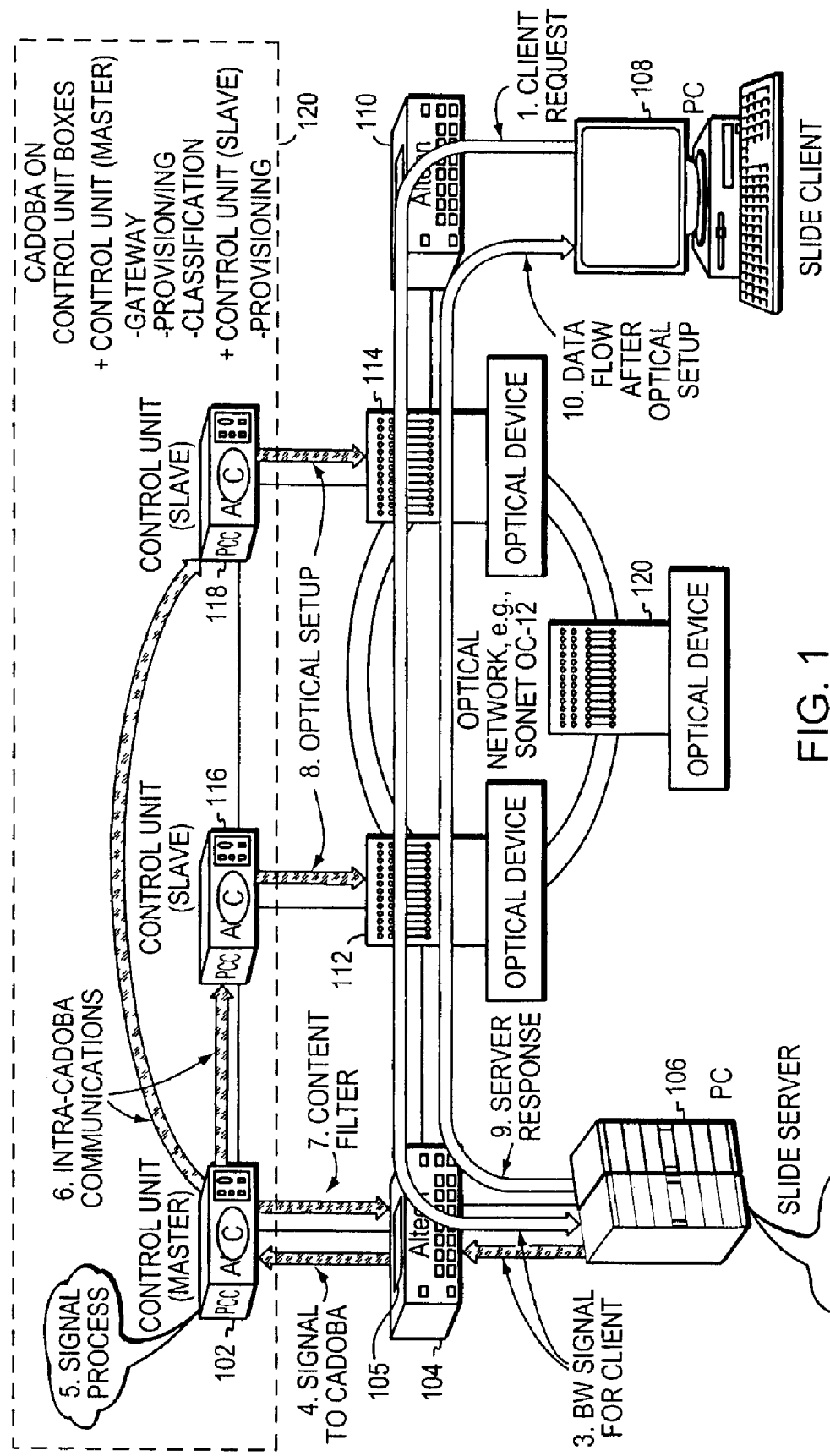
FIG. 1 shows an example of a network incorporating one embodiment of a CADOBA system according to the invention.

The present invention relates to content-aware dynamic network resource allocation. In one embodiment the network resource of interest is optical bandwidth and this embodiment is termed content-aware dynamic optical bandwidth allocation (CADOBA). With reference to FIG. 1, an example of a network 100 incorporating one embodiment of a CADOBA system according to the invention includes a client 108 communicating with a server 106. The server 106 communicates with an edge device 104, which is an electronic content switch. The edge device has a filtering and forwarding component 105. The edge device 104 in turn communicates with a master control unit 102. The master control unit 102 communicates with optical control units 116, 118. The optical control units 116, 118 in turn communicate with optical device(s) 112, 114.

Thus, the CADOBA system can reside on control units. That is, in one embodiment each control unit runs a CADOBA system respectively and they work together through intra-CADOBA communications.

Traffic refers to the data of an application traveling across a network, and signal traffic refers to the data of network resource requests of applications signaling to a network. Content refers to the L4 or high-layer (L4+) data carrying through the IP protocol, i.e., the payload of an IP packet. Typical content specifications include TCP/UDP headers, message identifiers such as HTTP (Hypertext Transfer Protocol) headers and RTSP (Real Time Streaming Protocol) method tags, and other L4+ characteristics.

With reference to FIGS. 1 and 2, a network device, such as the edge device 104, generally consists of a control unit 124 and a transport unit 122. The transport unit transports network traffic from an ingress interface to an egress interface. An ingress interface connects to one egress interface of an upstream device and an egress interface connects to one ingress interface of a down-stream device. The control unit does not forward any packet, rather it controls how the transport unit forwards traffic from one ingress interface to one egress interface. To perform intelligent network control, in FIG. 1 CADOBA facilitates communication between the edge device 104 and an external control unit 102, and between optical devices 112, 114 and external control units 116, 118.

With reference to FIG. 1, in one embodiment, a CADOBA system resides on each external network control unit, i.e., the edge device control unit 102 and optical device control units 116, 118. A network consisting of end, access, metro core and long-haul core networks (See FIG. 9) includes a large number of network devices. But CADOBA does not need to work with control units of all these network devices. Rather CADOBA works with two kinds of control units. One kind of control unit is the control unit 102 of the edge device 104. Using the control unit of the edge device, CADOBA causes the edge device 104 to route content-specific traffic from a legacy network domain to an optical network domain. The other kind of control unit is the control unit 116, 118 for respective entry optical devices. CADOBA controls these optical control units to allocate bandwidth for particular content traffic flows over optical networks.

With reference to FIG. 3, one embodiment of a CADOBA system includes a gateway module 126, a provisioning module 128, and a classification module 130. All three modules reside on a network control unit of an edge device while a provisioning module also resides on an entry optical device control unit. Thus, in one embodiment, as shown in FIG. 1, while the control unit slave boxes run the provisioning module or subsystem to set up optical lightpaths, the control unit master box runs all three subsystems or modules to interact with the control unit slave boxes and to apply control to an edge device.

In operation, and with reference to FIG. 4, one embodiment of a CADOBA system according to the invention initially uses the gateway module 126 to cause the transport unit of an edge device 104 to filter application traffic and to forward signal traffic to the gateway module. With reference to FIGS. 1 and 5, a server 106 sends a request 136, which is routed by the network to the transport unit 124 of an edge device 104. The edge device 104, based on the gateway module's prior instructions, redirects the signal traffic to the gateway module 126 at master control unit 102. The CADOBA system applies signal processing 132 to the signal traffic to obtain network resource requirements with content traffic characteristics. Based on the user requirements from applications, the CADOBA system performs provisioning 128 and classification 130 to accomplish network resource (e.g., optical bandwidth) allocation 134. In one embodiment, a bandwidth request is associated with a specified content stream of an application. An application may have any number of individual traffic streams. But that application will typically request bandwidth allocation only for some content-specified traffic streams. Moreover, an application can make a request for a group of traffic streams that have the identical content traffic characteristics. In one embodiment, the gateway module extracts content characteristics from the signal traffic and passes them to the classification module. In one embodiment, the transport to the gateway communication is internal network communication such as the Ethernet tunnel communication. The communication from the gateway subsystem to the provisioning subsystem is network-based intra-CADOBA communication similar to inter-process communication (IPC) on the same control unit or remote-procedure call (RPC) between two control units. Once CADOBA achieves network resource allocation, data from the requested application can begin to flow across the provisioned route.

With reference to FIG. 6, the provisioning module 128 typically performs bandwidth allocation 138 by interacting with multiple control units. For example, the provisioning module 128 can achieve bandwidth allocation 138 in the optical network domain 140 by using the user-to-network interface (UNI) technology to interface with a control unit that in turn controls an optical switch 146 to configure an optical link or lightpath. Similarly, the provisioning module 128 can achieve bandwidth allocation 138 in the legacy network domain 142 by an open network service platform such as OPENET, to interface with a control unit that in turn controls an electronic switch 144 to configure a physical transport port. On the optical network, the provisioning module either sets up a new optical link/lightpath or allocates a bandwidth portion of an existing link/lightpath. On the edge device, the provisioning module knows which physical port connects to the optical bandwidth router and allocates a portion of this port bandwidth. When the provisioning module completes the bandwidth allocation on both optical network and the edge device, it returns the results to the gateway module.

With reference to FIGS. 1 and 7, the classification module 130 configures a route for specified content 148 so that the content traffic flows toward a provisioned lightpath. The classification module 130 communicates the configured route to a legacy control device 150 such as the control unit 102 in FIG. 1, which in turn controls an electronic switch 144 such as an edge device 104 in FIG. 1 to route the content-specific traffic along the provisioned network resource route. The classification module receives information about specified content characteristics and edge device ports from the gateway module. Then, the classification module creates new routing rules for the edge device so that the application content traffic is classified and when necessary redirected from the original physical port and forwarded to the new port (towards to the optical bandwidth route). In one embodiment, the edge device is a content switch. The content switch supports redirecting content streams from a defaulted physical port to another port according to content-based filters. In one embodiment, content redirection is accomplished in hardware.

With reference to FIGS. 1 and 8, after the CADOBA system has performed content-aware network resource (e.g., optical bandwidth) allocation, an electronic switch 144, that is an edge device 104, at the legacy domain-optical domain boundary routes the client traffic 152 to one or more links or lightpaths of a specific optical switch 146. This optical switch 146, in turn, forwards client traffic 152 along onto one or more provisioned optical lightpaths.

Figure 9:
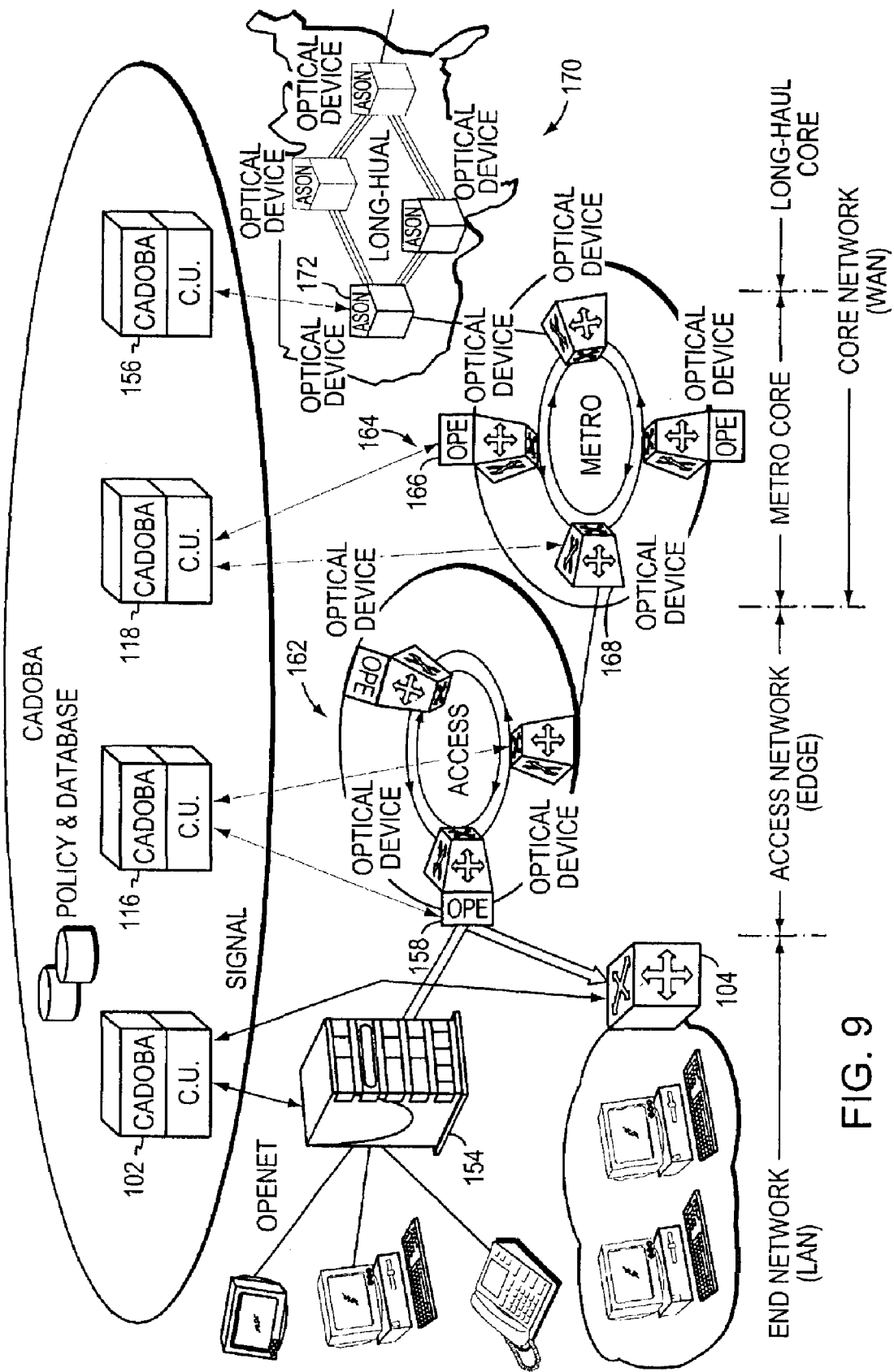
FIG. 9 shows another embodiment of a large network incorporating one embodiment of a CADOBA system according to the invention.

With reference to FIG. 9, structurally, the Internet consists of three types of networks: core networks (WAN), including metro core 164 and long haul core 170, operated by telecommunication carriers; access networks (Edge) 162 provided by ISPs; and end networks (e.g., LANs) set up by application users or enterprises. End networks include edge devices 154, 104. The metro core 164 can include metro optical switches 166, 168 with OPE. The long-haul core can include long-haul optical switches 172 with an ASON control unit. The access network can include metro optical switches 158, 160. As noted previously, CADOBA provides control over optical switches via optical gear control units 102, 116, 118, 156. Thus, CADOBA actually applies user intelligence in controlling the three types of networks—end, access/edge and optical core—in a unified way.

In order to appreciate user needs and to allocate optical resources in real time, CADOBA is focused at the optical edge (devices) even though it is distributed in the network. Applications at end networks signal their content specifications and network resource requirements to the network using a well-known signaling protocol such as RSVP.

The CADOBA gateway system residing at a control unit of an edge device, obtains signal packets by causing the transport unit of the edge device to filter application traffic and to forward signal traffic filtered from the application traffic to the gateway module. The edge device can filter application traffic using L3+ packet filters. The signal traffic includes network-related parameters, e.g., bandwidth, requests/requirements, and content tags/identifiers.

The CADOBA provisioning system at a control unit sets up a new lightpath in an optical network domain for the requested application traffic or manipulates an existing lightpath with dynamic bandwidth utilization. The provisioning system also sets up bandwidth configuration of an edge device so that application traffic can pass through without a bottleneck to the optical network domain.

The CADOBA classification system at a control unit causes an edge device, i.e., an electronic switch, to filter application traffic and to differentiate packets with specified content characteristics to form content streams. The classification system further causes the electronic switch to route the content streams to respective provisioned optical routes.

In one embodiment, the CADOBA processing is dynamic as application content and requirements may vary at runtime.

In summary, embodiments of the invention can include the following elements.

Transparent application signaling for content delivery requirements, including network resources and content specifications Dynamic signal filtering and redirection Processing signals for network resource requirements and content characteristics Network resource (e.g., bandwidth) allocation on demand Content-based differentiation and routing Having described the elements of and the operation of embodiments of the invention, a description of some of the advantages the invention now follows.

1. Dynamic Provisioning of Optical Links

Embodiments of the invention perform flexible optical route or lightpath establishment in optical networks according to application requests. For example, with certain optical products, one embodiment of the invention dynamically sets up an RPR (Resilient Packet Ring) over an existing optical SONET or DWDM ring, and increases or decreases the RPR use of the whole optical ring bandwidth.

2. Cost of the Optical Link Bandwidth is Divided Among Many Users

Embodiments of the invention enable a number of applications to share one optical link or lightpath by identifying the content of the applications and routing the applications traffic accordingly. For example, by forwarding applications traffic to respectively optical Ethernet ports in an RPR and adjusting the port rates, embodiments of the invention provide each application the optical bandwidth it requests. As a result, these embodiments of the invention increase the return on the service provider investment by utilizing the optical transport capability efficiently.

3. Provisioning Bandwidth is Flexible and Economic

Embodiments of the invention enable applications to request bandwidth in small increments, e.g., as small as 1 Mbps, which is a small portion of the whole link bandwidth. For example, with certain optical Ethernet support, an application can request a bandwidth from 1 Mbps to 1 Gbps.

4. Application Signal can Achieve Optical Control

The gateway module allows an application to achieve optical control by intercepting application signals at the edge device and transforming the application signal to a corresponding network control. For example, the optical control signal in turn effects a reconfiguration of optical devices, including, in one embodiment, a reallocation of bandwidth and establishment of an optical link or light-path.

5. Network Resource, E.G., Bandwidth, Allocation is Aware of Content

The classification module possesses strong content processing capability that can differentiate application streams according to their content (L4 or higher layer). For example, with certain optical gear, application traffic is classified and routed to a provisioned optical lightpath by forwarding packets to specific optical Ethernet ports. Consequently, content applications can achieve higher quality. Higher quality applications in turn lead to an increase in demand for bandwidth and generate more revenue from specialized network services.

EXAMPLE

In a demonstration of the operation of one embodiment of the present invention, an optical network included fibers and optical devices, a legacy electronic network included PC host systems, and content switches used as the edge devices bridging the two network domains: electronic (legacy) and optical. Portions of one embodiment of a CADOBA software system ran at the control unit of an edge device. Portions of the embodiment of the CADOBA system also ran at other network control devices. This embodiment acted as an intelligent gateway, transferring requests from content applications to network control units. The result in Table 1 shows that embodiments of the CADOBA system in FIG. 1 dynamically allocate the bandwidth of the legacy-optical network as requests from the content application SlideShow.

TABLE 1

Experimental Result of CADOBA

| Signal No. | Required BW | Provisioned BW | Throughput | Visual Effect |
| --- | --- | --- | --- | --- |
| 1 | 0 | 0 | 0 | No image shown |
| 2 | 1.00 Mbps | 1.00 Mbps | 0.935 Mbps | Slow |
| 3 | 10.00 Mbps | 10.00 Mbps | 9.77 Mbps | Normal |
| 4 | 100.00 Mbps | 100.00 Mbps | 47.51 Mbps | Fast |

The two programs Slideclient and Slideserver transmit continuously 2~3 MB JPEG images, running on two Pentium-2 Linux PCs. Slideserver is the image source and sends a requested image to Slideclient. Slideclient displays an image it receives.

"Required BW (Bandwidth)" is the bandwidth parameter requested by an application signal for the Slideclient-Slideserver content traffic. Slideserver signals a changing bandwidth every 30 seconds or longer.

"Provisioned BW (Bandwidth)" is the real bandwidth allocated by CADOBA for the requested content traffic. It is not always equal to the "Required BW (Bandwidth)" as network bandwidth becomes less available.

"Throughput" is the maximal rate that Slideclient receives pure image data from Slideserver via TCP at each signal case. It excludes overheads of L1-L4 protocol headers in a packet. The maximal throughput reached by the application programs is 47.51 Mbps.

An initial demonstration of the CADOBA system (see FIG. 1) used three optical devices (OPE included), 2 content switches, 3 control units and 2 Linux boxes for end applications. All of these network devices are available from Nortel Networks of Santa Clara, Calif.

With reference to FIG. 1, during the demonstration, SlideClient 108 sent an image service request to SlideShow for its content service. SlideClient 108 and SlideServer 106 are a pair of known application programs for delivering large images, with no modification for the illustrated embodiment of a CADOBA system. SlideServer 106 accepted the image request and signaled the network, using RSVP, an indication of the bandwidth required to deliver the image content. An embodiment of the invention, residing at a control unit (master) 102, instructed content switch 104 to filter and redirect the RSVP signal packets. The content switch by itself does not support the RSVP protocol nor processes an RSVP packet.

SlideServer 106 could signal again later at any time that the bandwidth requirement is changed. When this embodiment of the CADOBA system (at control unit master) processed the signal, it would perform a new network setup/configuration over the content switch and optical device when necessary. The new network setup/configuration can include reallocation of bandwidth, reconfiguration of forwarding priority and reconfiguration of optical content routes. As a result, at runtime, the illustrated embodiment provided dynamic bandwidth allocation and forwarding conditions, i.e., it provided different service levels based on signals from the requesting application.

Embodiments of the present invention advantageously encourage application developers to develop bandwidth intensive applications such as video teleconferencing, streaming media and storage area networking.

The present invention is not limited to bandwidth allocation. Rather, one can use embodiments of the invention in other applications. For example, one can use embodiments of the invention to create an optical virtual private network (VPN), to develop accounting packages that meter network usage by an application, and to build a many-to-many videoconference channel.

Furthermore, since certain changes may be made in the above constructions without departing from the scope of the invention, it is intended that all matter contained in the above description or shown in the accompanying drawings be interpreted as illustrative and not in a limiting sense.

What is claimed is:

1. A method for performing content aware optical bandwidth allocation over a network including an edge device and an optical control unit, the method comprising:
   receiving signal traffic of applications from the edge device, the signal traffic including information indicative of at least one of a content tag and a content identifier;
   using at least one of the content tag and the content identifier, determining a bandwidth request for specified content traffic from the signal traffic;
   communicating with the optical control unit to allocate optical bandwidth of an optical link to provide a provisioned optical route,
   communicating with the edge device to allocate bandwidth of a physical port by which content-specific traffic is forwarded to a provisioned optical route,
   creating content-aware rule data for the edge device to forward specified content traffic towards the provisioned bandwidth route; and
   applying the rule data to the edge device.

2. The method of claim 1, wherein the edge device includes a filtering and forwarding component.

3. The method of claim 1, wherein the network includes a plurality of optical control units and wherein the method further comprises communicating with more than one of the plurality of optical control units to allocate bandwidth based on the bandwidth request to provide a provisioned bandwidth route.

4. The method of claim 1, wherein the bandwidth request is an optical bandwidth request.

5. A system for performing content aware optical bandwidth allocation over a network including an edge device and a first optical control unit, the system comprising:
   a gateway module in communication with the edge device, the gateway module operative to receive signal traffic from the edge device, the signal traffic including at least one of a content tag and a content identifier, and to determine, from the signal traffic using the at least one of the content tag and the content identifier, a bandwidth request associated with specified content traffic;
   a provisioning module in communication with the gateway module, the provisioning module operative to receive a provisioning request from the gateway module regarding the bandwidth request for specified content traffic, to communicate with an optical control unit to allocate optical bandwidth based on the bandwidth request to provide a provisioned bandwidth route and to communicate with an edge device to allocate appropriate bandwidth based on the bandwidth request for forwarding the specified content traffic towards the provisioned bandwidth route; and
   a classification module in communication with the gateway module, the classification module operative to receive a content classification request from the gateway module, and, based on the content classification request, to create a content-aware routing rule for the edge device to forward specified content traffic to the provisioned bandwidth route.

6. The system of claim 5, wherein the system further comprises:
   a second optical control unit in communication with the provisioning module, the provisioning module operative to communicate with the optical control unit to allocate bandwidth based on the bandwidth request to provide a provisioned bandwidth route.

7. The system of claim 5, wherein the gateway module is further operative to cause the edge device to forward signal traffic to the gateway module.

8. The system of claim 5, wherein the edge device includes a control unit and wherein the provisioning module is in communication with the control unit of the edge device to allocate bandwidth on the edge device based on the bandwidth request to provide a provisioned bandwidth route.

9. A method for performing content aware optical bandwidth allocation over a network including an edge device and a first optical control unit, the method comprising:
   receiving signal traffic of applications from the edge device, the signal traffic including information indicative of at least one of a content tag and a content identifier;
   using at least one of the content tag and the content identifier, determining a network resource request for specified content traffic from the signal traffic;
   communicating with the first optical control unit to allocate a network resource to provide a provisioned optical route;
   communicating with the edge device to allocate the network resource for forwarding specified content traffic to a provisioned optical route;
   creating content-aware rule data for the edge device to forward specified content traffic to the provisioned optical route; and
   applying the rule data to the edge device.

10. The method of claim 9, wherein the network resource is optical bandwidth.

11. The method of claim 10, wherein receiving signal traffic comprises:
   receiving a bandwidth request for specified content traffic, the bandwidth request having been transmitted using a resource signaling protocol.

12. The method of claim 10, wherein the method is repeated to provide dynamic optical bandwidth allocation.

13. The method of claim 10, wherein the method further comprises:
   filtering content traffic according to the rule data; and
   routing filtered content traffic according to the rule data.

14. The method of claim 10, wherein communicating with an optical control unit comprises:
   forwarding a bandwidth request signal to the first optical control unit and, at the first optical control unit, managing the optical bandwidth of an associated optical gear in response to the received request.

15. The method of claim 14, wherein managing the optical bandwidth of an associated optical gear comprises managing an optical interface port of associated optical gear.

16. The method of claim 14, wherein the method further comprises:

forwarding a bandwidth request to a second optical control unit to allocate bandwidth along a provisioned bandwidth route and, at the second optical control unit, receiving the request and managing the optical bandwidth of an associated optical gear in response to the received request.

17. The method of claim 10, wherein the method further comprises:

receiving traffic at the edge device, the traffic being sent by a client and including signal traffic; and filtering and forwarding the signal traffic.

18. The method of claim 10, wherein the method further comprises:

allocating bandwidth at the edge device for specified content traffic passing through the edge device.

19. The method of claim 9, wherein the method further comprises applying the rule data to the edge device.

20. The method of claim 9, wherein receiving signal traffic from the edge device comprises:

causing the edge device to forward signal traffic to a gateway module, the gateway module operative to determine a network resource request for specified content traffic from the signal traffic.

* * * * *